United States Patent Office 2,938,066
Patented May 24, 1960

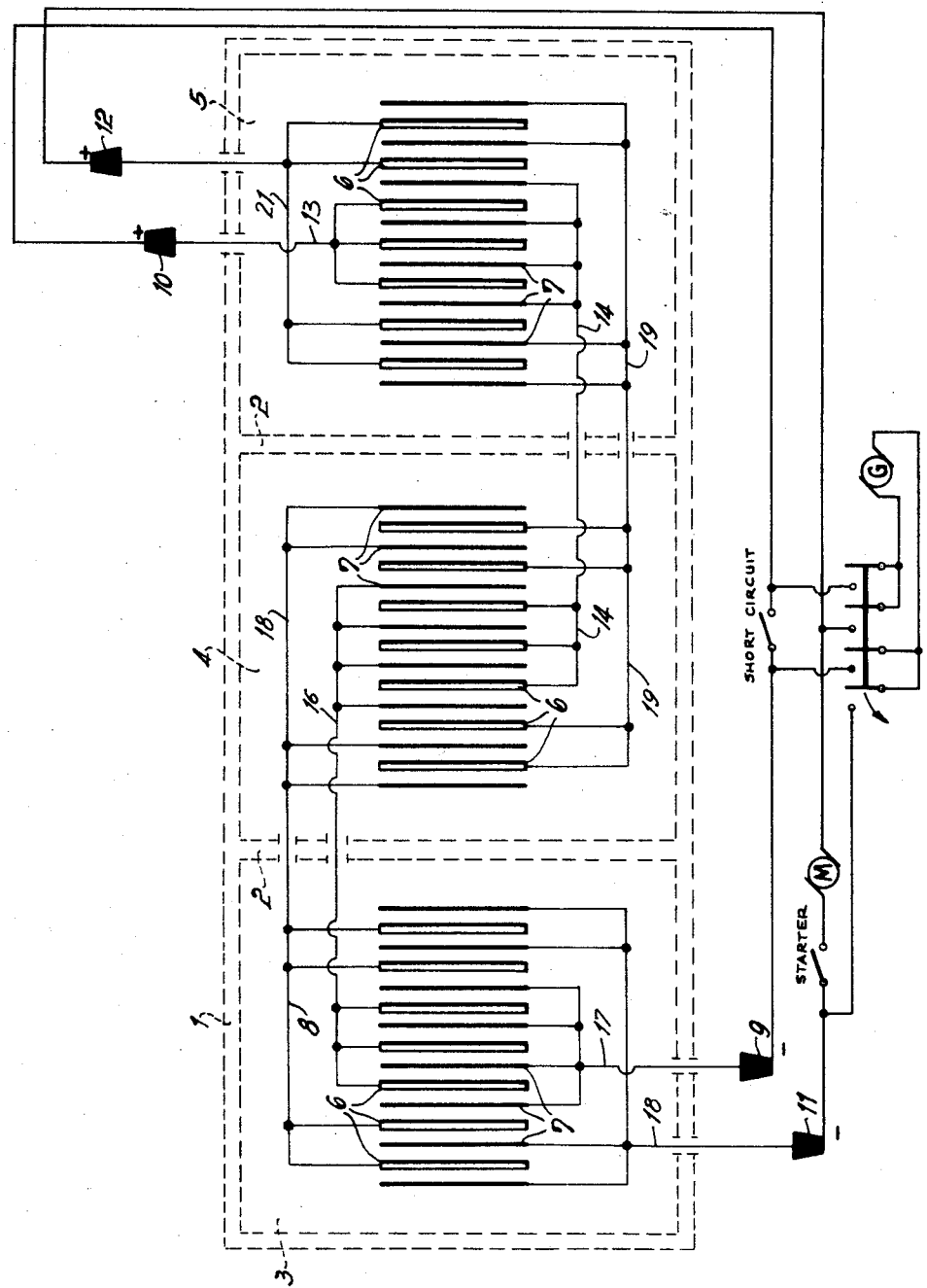

2,938,066
INTERNAL BATTERY HEATING ARRANGEMENT

Helmut Weigand, Stuttgart-Stammheim, Germany, assignor to Robert Bosch G.m.b.H., Stuttgart, Germany Filed May 24, 1956, Ser. No. 586,947

Claims priority, application Germany June 8, 1955

4 Claims. (Cl. 136—161)

The present invention relates to a new and improved storage battery arrangement. More particularly, the present invention relates to a new and improved cell arrangement for storage batteries wherein the storage battery may be heated before starting current is drawn therefrom, in the event of extremely low outer temperatures.

Storage batteries are usually used in automotive vehicles and the like for an energization source for a starting motor for the automotive vehicle. It is well known that in extremely low temperatures the charging and discharging rates for a storage battery become much lower. That is, the amount of current that the storage battery is able to deliver in a certain period of time for starting purposes decreases with decrease in temperature.

There have therefore been many arrangements developed for heating the storage battery and the electrolytes of the storage battery cell in order to correct this difficulty of storage batteries in low temperatures. Some of these conventional arrangements include for example electric or gasoline heaters which are attached beneath the hood of the automotive vehicle adjacent the storage battery. This helps to increase the temperature of the storage battery regardless of the outside temperature. It is clear however that this is a highly inefficient heating arrangement since the developed heat must work its way through the outer casing of the storage battery and heat the same until the electrolyte is reached which is the place where the heat will do the most good.

It is accordingly an object of the present invention to overcome the disadvantages of conventional storage battery arrangements.

A second object of the present invention is to provide a new and improved storage battery cell arrangement wherein the cell may be heated internally regardless of the outer ambient temperature.

A further object of the present invention is to provide a new and improved storage battery cell arrangement wherein part of the plates of the cell are used for heating the electrolyte therein before starting and these same plates may be used for supplying load currents after the automotive vehicle has started.

Still another object of the present invention is to provide a new and improved storage battery multicell arrangement wherein the plates of each cell are divided into two separate types of pairs of positive and negative plate arrangements and are respectively connected to different positive and negative terminals on the storage battery housing.

With the above objects in view, the present invention mainly consists of a storage battery cell arrangement having a housing, an electrolyte disposed in the housing, a plurality of pairs of spaced positive and negative plates arranged in the housing, and means adapted to electrically connect together some of the plurality of pairs while permitting the remainder of the plates to be used for starting and load current supplying purposes.

In a preferred embodiment of the present invention each of the cells of the storage battery includes a plurality of pairs of positive and negative battery plates. For starting purposes, some of the plates are connected together. That is, the positive and negative plates are connected together to produce a short circuit current. This short circuit current flowing through the internal resistance of the battery serves to raise the temperature of the electrolyte in which the plates are arranged. After the electrolyte has been raised in temperature a sufficient amount, the remaining positive and negative plates, which have not yet been connected, may be used for supplying starting current to the automotive vehicle.

It is a further feature of the present invention to arrange the plates which are to be short circuited for starting purposes within the area made up of the plates which are to be used solely for load current supplying purposes.

The novel features which are considered as characteristic for the invention are set forth in particular in the appended claims. The invention itself, however, both as to its construction and its method of operation, together with additional objects and advantages thereof, will best be understood from the following description of a specific embodiment when read in connection with the accompanying drawing, which is a diagrammatic plan view of an improved storage battery cell arrangement constructed in accordance with the principles of the present invention.

Referring to the drawing, it can be seen that the storage battery is mounted within a housing 1 which is shown in dotted lines. In the illustrated embodiment the storage battery includes three storage battery cells, 3, 4, and 5 respectively. The cells 3, 4 and 5 are separated from each other by separating partitions 2.

In the drawing, each of the negative battery plates is represented respectively by a thin black line while the positive battery plates are represented respectively by elongated rectangular lines. It can be seen that each of the cells 3, 4 and 5 contain respectively a total of fifteen battery plates. That is, each of the cells has eight negative battery plates separated respectively by seven positive battery plates. The positive battery plates are indicated by the numeral 6 and the negative battery plates are indicated by the numeral 7.

In accordance with the present invention the center three positive battery plates 6 of each of the cells 3, 4 and 5 are respectively connected together. Similarly, the central four negative battery plates 7 of each cell are respectively connected together.

In cell No. 5 the three positive battery plates are connected by means of a conductor 13 to a positive terminal 10 mounted on the housing of the storage battery. In the cell 5, the central four negative battery plates 7 are connected by means of a conductor 14 passing through the partition 2, to the central three positive plates 6 of the cell 4. In the cell 4, the center four negative plates 7 therein are connected by a conductor 16 to the center three positive plates 6 of the cell 3. Finally, in the cell 3 the center four negative plates are connected by a conductor 17 to the negative terminal 9 of the storage battery.

It therefore can be seen, in accordance with the present invention, that a first group of spaced positive and negative battery plates are provided in each of the storage battery cells. These spaced positive and negative battery plates of each of the cells are respectively connected in series between the negative terminal 9 and the positive terminal 10 to form a first storage battery arrangement.

It can also be seen that connected to the negative terminal 11 of the storage battery, by means of a conductor 18, are four negative battery plates 7 in the cell 3. Two of these last mentioned negative battery plates 7 are disposed on one side of the central negative plates and the remaining two plates are disposed on the other side of the central plates of the cell 3. Similarly, four positive battery plates are connected together in the cell 3 by means of the conductor 8. As above, two of the four positive plates are disposed on one side of the central battery plates and the other two are disposed on the other side thereof.

These four positive battery plates 6 are connected by the conductor 8 to four negative battery plates 7 in the central storage battery cell 4. It can be seen that these last mentioned four negative battery plates are disposed in the cell 4 in the same manner as the negative battery plates in the cell 3.

The four negative battery plates of the second plurality of spaced positive and negative battery plates cooperate with four positive battery plates which are connected together by means of a conductor 19 and are connected in turn thereby to four negative battery plates 7 in the cell 5 of the storage battery arrangement. It is apparent that the last mentioned negative battery plates 7 are disposed in the same manner as the negative battery plates of the cells 3 and 4. Finally, these last mentioned negative battery plates 7 cooperate with four spaced positive battery plates 6 which are connected together by means of a conductor 21 and connected thereby to the second positive terminal 12 of the storage battery.

From the above description it is apparent that two pairs of negative and positive terminals are provided with the storage battery arrangement incorporating the principles of the present invention. These four terminals are all electrically insulated from one another. The negative terminal 9 and the positive terminal 10 cooperate with each other by being connected to opposite ends of one group of series connected cells, each of which is respectively composed of pairs of spaced negative and positive battery plates which are centrally mounted in the electrolyte of each of the respective cells. Similarly, the negative terminal 11 cooperates with the positive terminal 12 by being connected to opposite ends of a second group of series connected cells made up of a plurality of pairs of spaced positive and negative battery plates, which plates are mounted on both sides of the centrally located plurality of pairs of spaced positive and negative battery plates.

Both sets of plates are mounted in the same electrolyte and possess the same potential.

In order to charge the storage battery connected in accordance with the present invention and illustrated in the drawing, the negative terminals 9 and 11 are connected together to the negative terminal of a direct current source G and the positive terminals 10 and 12 are connected together to the positive terminal of the direct current source. That is, the above mentioned cell arrangements of the storage battery composed of two separate groups of pairs of plates, respectively, are charged in parallel.

The current for a load M is supplied primarily between the terminals 11 and 12 of the storage battery which represents a cell made up of the larger number of battery plates. In accordance with the present invention, in order to heat the electrolytes, in the event of a very low ambient outer temperature, the negative terminal 9 is directly connected to the positive terminal 10 of the storage battery. This causes a short circuit current to flow between the terminals 9 and 10 supplied by the battery cells made up of the smaller number of plates which are centrally disposed in each of the larger cells. After a time interval, when the electrolyte has become sufficiently heated, the load current e.g. for starting the automotive vehicle (through motor M) is drawn from the terminals 11 and 12. Since these terminals are connected to only those groups of negative and positive battery plates, respectively, which have not been used to produce short circuit heating currents, the starting capacity of these plates is very high. This is of great advantage because, if all of the positive and negative battery plates of the three cells of the storage battery had been connected to each other, although a higher resultant short circuit heating current would flow, this would lower the ability of these plates to supply starting current. Therefore, if in such a contemplated arrangement the short circuit is then removed and starting current is sought to be obtained therefrom, it will be found that only a very small current is available.

On the other hand, in accordance with the principles of the present invention, since the battery plates which are short circuited for heating purposes are not used for starting current purposes, this difficulty does not exist. After the load current flows from the storage battery, the centrally disposed plates, which have been short circuited, will be restored to their initial capacity.

Of course, after the load current for the starting operation has been taken from terminals 11 and 12, it is possible to connect the terminal 9 with 11 and 10 with 12 and then use all of the battery plates to supply load current. However the importance of the present invention is in the use of a group of separate plates for providing short circuit current to increase the temperature of the electrolyte and using a group of additional plates to provide the necessary starting current.

In one preferred embodiment of the present invention, construction in accordance with the drawing, with an ambient temperature of −40° the temperature of the storage battery was raised 50° C. to achieve a starting temperature of +10° C. within 10 to 20 minutes of short circuit current flow. The advantages of such an arrangement are readily apparent.

It will be understood that each of the elements described above, or two or more together, may also find a useful application in other types of battery arrangements differing from the types described above.

While the invention has been illustrated and described as embodied in a new and improved storage battery cell arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a storage battery cell arrangement having housing means holding an electrolyte and a plurality of interspaced positive and negative plates in said electrolyte, the improvement of having said plates arranged in a first group of positive and negative plates and a second group of positive and negative plates, a first set of positive and negative terminals being provided for said first group of said plates, and a second set of positive and negative terminals being provided for said second group of said plates, and circuit means including switch means for alternatively connecting either said first set of terminals directly with each other for causing a short-circuit current to flow between the plates of said first group to raise the temperature in the storage battery, while leaving said second set of terminals and said second group of plates unconnected, or for connecting said first and second sets of terminals in parallel with each other to an outside load.

2. In a storage battery cell arrangement having housing means holding an electrolyte and a plurality of interspaced positive and negative plates in said electrolyte, the improvement of having said plates arranged in a first group of positive and negative plates and a second group of positive and negative plates, a first set of positive and negative terminals being provided jointly for said first group of said plates, the positive plates and the negative plates thereof being respectively connected in parallel, and a second set of positive and negative terminals being provided jointly for said second group of said plates, the positive plates and the negative plates thereof being respectively connected in parallel, and circuit means including switch means for alternatively connecting either said first set of terminals directly with each other for causing a short-circuit current to flow between the plates of said first group to raise the temperature in the storage battery, while leaving said second set of terminals and said second group of plates unconnected, or for connecting said first and second sets of terminals in parallel with each other to an outside load.

3. In a storage battery cell arrangement having housing means holding an electrolyte and a plurality of interspaced positive and negative plates in said electrolyte, the improvement of having said plates arranged in a first group of positive and negative plates and a second group of positive and negative plates, the number of plates in said second group being larger than the number of plates in said first group, a first set of positive and negative terminals being provided jointly for said first group of said plates, the positive plates and the negative plates thereof being respectively connected in parallel, and a second set of positive and negative terminals being provided jointly for said second group of said plates, the positive plates and the negative plates thereof being respectively connected in parallel, and circuit means including switch means for alternatively connecting either said first set of terminals directly with each other for causing a short-circuit current to flow between the plates of said first group to raise the temperature in the storage battery, while leaving said second set of terminals and said second group of plates unconnected, or for connecting said first and second sets of terminals in parallel with each other to an outside load.

4. In a storage battery cell arrangement having housing means holding an electrolyte and a plurality of interspaced positive and negative plates in said electrolyte, the improvement of having said plates arranged in a first group of positive and negative plates and a second group of positive and negative plates, the number of plates in said second group being larger than the number of plates in said first group, said second group being arranged between at least one pair of positive and negative plates of said first group on one side and at least one other pair of positive and negative plates of said first group on the other side of said second group, a first set of positive and negative terminals being provided jointly for said first group of said plates, the positive plates and the negative plates thereof being respectively connected in parallel, and a second set of positive and negative terminals being provided jointly for said second group of said plates, the positive plates and the negative plates thereof being respectively connected in parallel, and circuit means including switch means for alternatively connecting either said first set of terminals directly with each other for causing a short-circuit current to flow between the plates of said first group to raise the temperature in the storage battery, while leaving said second set of terminals and said second group of plates unconnected, or for connecting said first and second sets of terminals in parallel with each other to an outside load.

References Cited in the file of this patent
UNITED STATES PATENTS

| | | |
|---|---|---|
| 431,447 | Dixon | July 1, 1890 |
| 979,154 | Gugler | Dec. 20, 1910 |
| 2,700,064 | Akerman | Jan. 18, 1955 |
| 2,710,937 | Godshalk et al. | June 14, 1955 |